United States Patent [19]

Maranto et al.

[11] Patent Number: 4,822,130
[45] Date of Patent: Apr. 18, 1989

[54] FIBER OPTIC HERMETIC FEEDTHROUGH

[75] Inventors: Jack J. Maranto, Capistrano Beach; Gregory B. Noll, Corona, both of Calif.

[73] Assignee: Hughes Aircraft Company, Los Angeles, Calif.

[21] Appl. No.: 87,832

[22] Filed: Aug. 21, 1987

[51] Int. Cl.[4] ............................................. G02B 6/36
[52] U.S. Cl. ................................................ 350/96.20
[58] Field of Search ................ 350/96.20, 96.18, 96.22

[56] References Cited

U.S. PATENT DOCUMENTS 3,825,320 7/1974 Redfern ............................ 350/96.18
4,707,068 11/1987 Moulin ............................. 350/96.22

Primary Examiner—James W. Davie
Attorney, Agent, or Firm—Joseph E. Szabo; Anthony W. Karambelas

[57] ABSTRACT

A fiber optic feedthrough connector 10, typically mounted in a panel 13 through which contact is to be made, carries a double-ended terminus 47 hermetically sealed, anchored in, and extending through a wall portion 17 of the connector 10. An optic fiber 24 extends axially through the double-ended terminus 47 and is terminated at opposite ends in a pair of alignment bushings 57. Alignment inserts 21, 23 extending from opposite ends of the connector 10 serve both to protect the double-ended terminus 47 and to provide means for keyed engagement with connectors on opposite sides of the panel 13 in which the connector 10 is mounted.

17 Claims, 2 Drawing Sheets

FIBER OPTIC HERMETIC FEEDTHROUGH

BACKGROUND OF THE INVENTION

1. Field of the Invention

This invention is related to fiber optic connectors in general and more particularly to hermetically sealed feedthrough connectors.

2. Description of Related Art

There exists a family of fiber optic connectors, exemplified by that described in U.S. Pat. No. 4,707,068, issued Nov. 17, 1987 by Norbert L. Moulin and assigned to the assignee of the present invention, which is characterized by a fiber optic terminus spring loaded in a connector body. In the male version, an optic fiber which extends axially through the terminus terminates in an alignment bushing which forms the tip of the terminus. The female version of such a terminus, with which the just described male version is to mate, is similar to the male version except that it is typically not spring loaded, and in that it includes a resilient alignment sleeve carried by the terminus and extending forward of its alignment bushing. When a pair of connectors respectively carrying a male and a female terminus are intercoupled, the male and female termini mate by insertion of the alignment bushing of the male terminus into the protruding portion of the resilient alignment sleeve. The bushings are typically of the same size, both having diameters which are slightly larger than the internal diameter of the resilient sleeve, so that it is caused to expand by insertion of the alignment bushings into its opposite ends. In this manner the bushings are precisely aligned with each other, as are the optic fibers which extend axially through the bushings and terminate in their end faces with which they are typically ground and polished.

In those situations where contact is to be made between a pair of optic fibers through a mounting panel, it would be desirable to provide a feedthrough connector, preferably hermetically sealed, which is adapted to work with connectors of the type just described. Accordingly, it is the general object of the present invention to provide a feedthrough connector whereby contact may be made between a pair of fiber optic connectors of the type described through a mounting panel. A more specific object of the present invention is to make such a contact between fiber optic connectors having termini designed to mate by insertion into a common resilient alignment sleeve. Yet another specific object of the present invention is to provide a hermetically sealed feedthrough connector for interconnecting a pair of fiber optic connectors having fiber optic termini, at least one of which is spring loaded.

SUMMARY OF THE INVENTION

Meeting the above and other objects of the present invention, the present invention incorporates a housing having a wall through which a fiber optic contact means extends, with the contact means terminating at opposite ends in a light coupling surface. Preferably, the contact means is hermetically sealed to and anchored in the wall portion of the connector and comprises a double ended terminus through which an optic fiber extends axially, the terminus having at opposite ends light coupling surfaces in which the optic fiber terminates. In further keeping with the invention, the light coupling surface at each end of the terminus includes a bushing having an end surface which is flush with the end of the optic fiber. To effect engagement between the termini of a pair of fiber optic connectors on opposite sides of the mounting panel, the double ended terminus of the feedthrough connector carries, or is adapted to receive, at each end an alignment sleeve, into one end of which an end of the double ended terminus extends, and into the other end of which a fiber optic terminus of one of the two connectors that are to be interconnected through the feedthrough connector is to be inserted.

Advantageously, an alignment insert may be fastened into opposite portions of the housing, extending in diametrically opposite directions from the wall through which the double ended terminus extends. These serve both to insure that the respective connectors which are to be engaged through the feedthrough connector do not rotate relative to the feedthrough connector when they are engaged therewith, and also to protect the respective ends of the double ended terminus by shrouding them. Typically the alignment inserts are threadably engaged with the housing, and serve also to threadably receive the coupling ring of one of the two connectors which is to be engaged through the feedthrough connector.

BRIEF DESCRIPTION OF THE DRAWINGS

The invention will be best understood by reference to the accompanying drawings in which.

DETAILED DESCRIPTION OF THE PREFERRED EMBODIMENT

Figure 1:
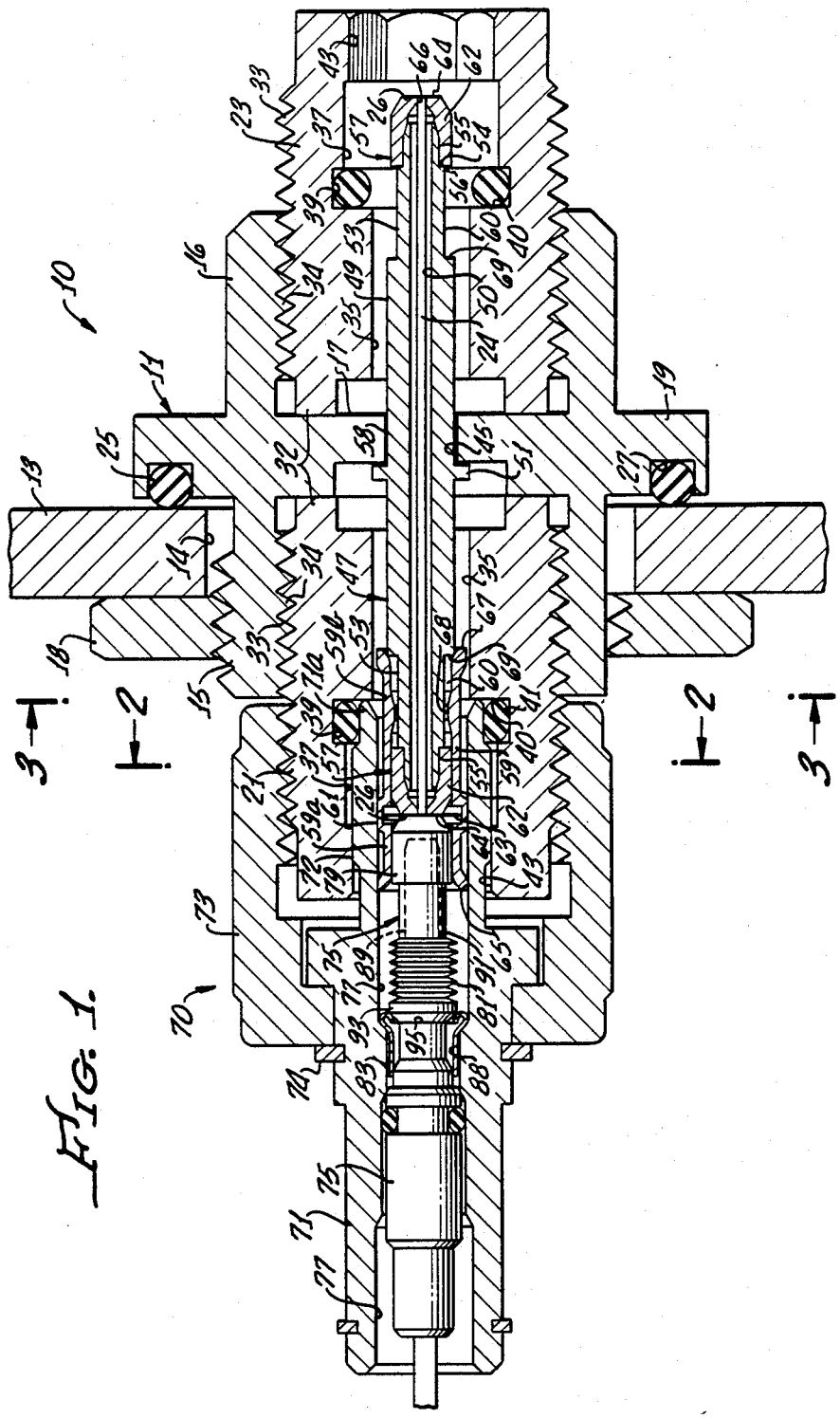
FIG. 1 is a cross sectional view through an assembly which includes the feedthrough connector and one of the pair of fiber optic connectors which are to be interconnected therethrough.
Figure 3:
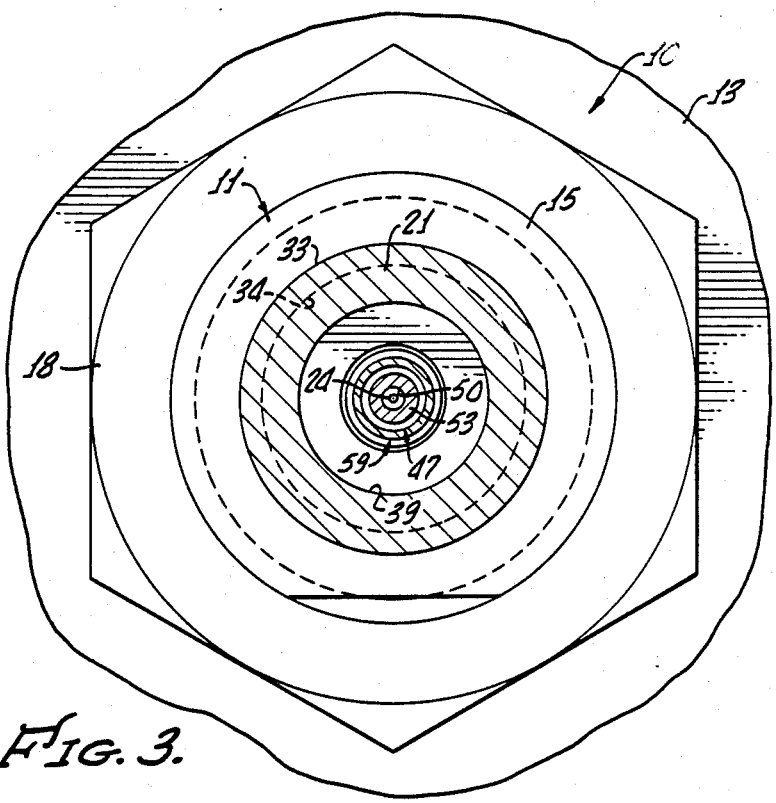
FIG. 3 is a cross section taken along the line 3—3 through the assembly depicted in FIG. 1.
Figure 2:
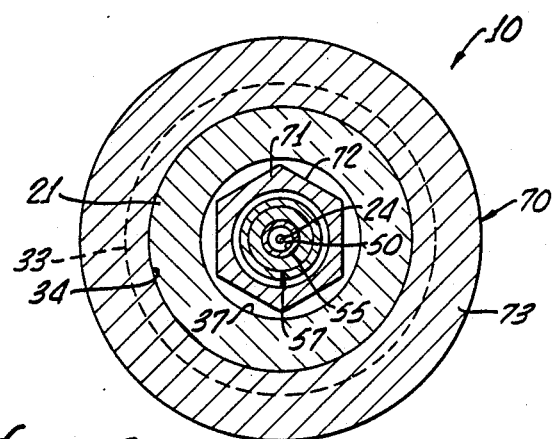
FIG. 2 is a cross section along the lines 2—2 through the assembly depicted in FIG. 1.

Turning now to the drawings, FIGS. 1-3 illustrate a preferred embodiment of a feedthrough connector 10 made in accordance with the present invention. It is shown mounted in a panel 13 through which the connector 10 is to establish optical coupling between a pair of hermetically isolated fiber optic connectors on opposite sides of the panel. Principal components of the connector 10 include a housing or core portion 11, a double-ended terminus 47 and a pair of alignment inserts 21 and 23. The housing 11 may also be considered as including the inserts 21 and 23. Inserted through a hole 14 in the mounting panel 13, the housing 11 includes a centrally disposed wall 17 from which there extend in opposite directions a pair of internally threaded receptacles 15 and 16, one of which (15) is externally threaded as well. The connector 10 is held in place on the mounting panel 13 by a jam nut 18 threaded externally onto the receptacle 15. Extending around the outside of the housing 11, between the receptacles 15 and 16, is a peripheral flange 19 dimensioned to cover and extend beyond the mounting panel opening 14. A peripherally extending groove 27, located in the flange 19 and facing the mounting panel 13, contains an O-ring 25 to provide a hermetic seal between the panel 13 and the housing 11.

The double-ended terminus 47 is anchored in the wall 17, extending in opposite directions therefrom, with its ends protruding beyond the receptacles 15 and 16. The alignment inserts 21, 23, which are individually coupled to respective ones of the receptacles 15, 16, serve to protect the protruding ends of the terminus 47. In the exemplary embodiment, the alignment inserts 21, 23 are identical. Therefore, the same reference numerals will be used to designate corresponding details thereof. Each insert includes an external thread 33 which mates with corresponding internal receptacle threads 34. The inserts are turned in the internal receptacle threads 34 until the insert tips 32 abut against the wall 17.

Turning next to a detailed description of the terminus 47, in its preferred form the terminus carries an optic fiber 24 extending axially therethrough and is terminated at its opposite ends in light coupling surfaces 26. The terminus 47 is advantageously constructed of an integral pin member 49 carrying a pair of alignment bushings 57 on its opposite ends. Bore 50 extends axially through the pin 49, and an optic fiber 24 extends the length of the pin 49 through the bore 50. The pin 49 terminates at each end in progressively stepped portions 53, 55. Each stepped end portion 55 receives one of the bushings 57 which is interference fitted onto the pin 49 and abuts at its rear external wall 56 the shoulder 54 separating the pin portions 53, 55. A groove 60 is accordingly defined by the bushing rear wall 56, the pin region 53 and a second shoulder 69, separating the pin region 53 from the central portion of the pin. The purpose of this channel is to retain an alignment sleeve 59 in a manner to be explained shortly.

The bushings 57 have a cylindrical side wall 62 and an end wall having a flat external face 64. An axial bore 66 penetrates each bushing's end wall. With the bushings 57 fitted onto the ends of the pin 49, the optic fiber 24 extends fully through the bushing bores 66. In a manner well known in the art, the bushing faces 64 are ground and polished along with the optic fiber 24 so as to present a flat light coupling surface 26.

Extending peripherally around the central portion of the pin 49 is a mounting flange 51. In assembling the feedthrough connector 10, the terminus 47 is inserted through the through-hole 45 of the wall 17 until the mounting flange 51, which is slightly larger than the hole 45, abuts against the facing portion of the wall 17. Enough clearance is provided between the wall 17 and the pin 49 to admit a layer of solder or epoxy, whichever is preferred, to effect a hermetic seal between the pin 49 and the wall 17. As shown, the epoxy or solder layer 58 should extend along the portion of the pin 49 which extends through the through-hole 45 and along the side of the retaining flange 51 facing the wall 17 for optimum hermetic seal.

The principal function of the feedthrough connector 10 is to provide coupling between a pair of fiber optic connectors 70 which are on opposite sides of the mounting panel 13. To appreciate the manner in which this is achieved, a brief description of such a connector will be helpful. It typically includes a body 71 penetrated by an axial bore 77 through which there extends, and in which there is retained, a spring loaded optical contact assembly 75. Such a contact assembly is described and shown in detail in U.S. Pat. No. 4,595,251 issued to Norbert L. Moulin, and assigned to the assignee of the present invention. It includes a pin body 89 having a bushing 79 interference fitted onto its end, a spacer 91 slidably disposed on the pin body and located just behind the bushing 79, a retaining clip 83 approximately at the midpoint of the pin body 89, a conical washer 93 just forward of the retaining clip 83 and backstopped against a shoulder 95, and a set of belleville washers 81 serving as springs and sandwiched between the conical washer 93 and the spacer 91. An optic fiber, not shown, extends through the length of the pin body 89 and the alignment bushing 79 along axially extending bores therein in a manner similar to that of the doubleended terminus 47.

The optical contact assembly 75 is retained in the connector 71 by the interaction between the retaining clip 83 and a constriction 88 in the axial bore 77. The optical contact assembly 75 may be inserted from the back end of the connector body 71. As it is so inserted, the retaining clip is compressed as it slides through the constricted portion 88 and then expands again as it clears that constricted portion, thus capturing the pin in the axial bore 77. Spring loading is accomplished by means of the belleville washers 81 which became compressed when pressure is exerted on the bushing 79 toward the connector body 71. Under such pressure the bushing 79, the pin body 89 and the spacer 91 all travel toward the connector body 71, compressing the belleville washers 81 between the conical washer 93 and the spacer 91.

Completing the connector 70 is a coupling ring 73 held in place by a retaining ring 74 on the connector body 71. It is by means of the coupling ring 73 that the mating connector 70 is firmly engaged with the feedthrough connector 10, this being accomplished by the threading of the coupling ring 73 onto the external thread of the alignment insert 21.

Only one of the connectors 70 engageable to and through the feedthrough connector 10 is shown. Normally such a connector, shown as a male connector, is engaged to a similar connector which differs therefrom principally in that it is converted to a female connector by the provision of an alignment sleeve which is carried on the contact assembly 75. Such an arrangement, including a suitable alignment sleeve, is shown and described in U.S. Pat. No. 4,707,068, issued Nov. 17, 1987 by Norbert L. Moulin, for "Optical Fiber Waveguide Connector System" and assigned to the assignee of the present invention.

Advantageously, the type of alignment sleeve which is normally used to create a female connector in the manner just described is used to make each end of the feedthrough connector 10 of the female type so as to enable it to provide optical coupling between a pair of male connectors of the type shown. In keeping with this aspect of the invention, an alignment sleeve 59 is pressed onto each end of the connector terminus 47. The construction of each alignment sleeve 59 may be the same as that which is commercially available and which has been supplied for some time by the assignee of the present invention. The alignment sleeve 59, formed of a resilient material, preferably heat treated beryllium copper, is split end to end so that it is basically C-shaped in cross section, thereby making it capable of flexing when contacts are inserted therein.

The sleeve 59 (of which only one is illustrated) comprises a relatively short front section 59a or end portion and a rear section 59b which is about twice as long. Separating the front and rear sections of the sleeve 59 is a peripherally extending retaining ridge 61 which serves to house a thin spacing shim 63 whose function is to prevent face to face abutment of optical contact assemblies inserted toward one another from opposite ends of the sleeve 59. The long portion 59b of the split sleeve terminates in a reinforced back end 67, while the front portion 57a terminates in a flared lip 65. Approximately in the middle of the long portion 59b of the alignment sleeve 59 there extends an internal retaining ridge 68.

Each of the alignment sleeves is mounted on the terminus 47 with its reinforced back end 67 leading. The internal retaining ridge 68 is spaced from the rear end of the alignment sleeve 59 so that when that rear end abuts against the shoulder 69 of the pin 49, the internal retaining ridge 68 will have just cleared the rear wall 56 of the bushing, snapping in place in the groove 60 formed by the pin shoulder 69, the pin region 53, and the bushing rear wall 56. With the alignment sleeve 59 thus anchored on the terminus 47, the spacing shim 63 is positioned immediately adjacent the front surface 64 of the alignment bushing 57 and floats axially in its retaining ridge 61 to a sufficient extent to allow for slight dimensional variations.

As the mating male connector 70 is engaged with the feedthrough connector 10 by turning of the coupling ring 73, the connector body 71 is forced to move toward the center of the feedthrough connector 10. As it does so, its front end 71a bears against and compresses an O-ring 41 carried in a groove 39, separating a relatively constricted portion 35 and a somewhat larger portion 37 of the internal bore which extends through each alignment insert 21, 23. This provides a seal against leaks between the mating connectors 70 and the interconnecting feedthrough connector 10 around the terminus 47. It will be noted further that the enlarged portion 37 of the alignment insert bore terminates in a hexagonal throat 43 which keys the mating connector body 71 against rotation as the coupling ring 73 is turned around the alignment insert 21 or 23. For this purpose the portion 72 of the connector body has a hexagonal external surface where it engages the internally hexagonal throat 43 of one of the alignment inserts 21, 23.

Full engagement of the mating connector 70 with the feedthrough connector 10 is determined by abutment of the mating connector body front portion 71a against a stop surface 40 defined by the shoulder of the insert 21 extending inwardly just past the O-ring 41. The front face 64 of the alignment bushing 57 which, along with the optic fiber 24, helps define the light coupling surface 26, is so positioned relative to the alignment insert stop surface 40 that, before the coupling ring 73 drives the connector body front end 71a against the stop surface 40, the alignment bushing 79 of the mating connector 70 is brought to bear against the alignment bushing 57 of the feedthrough connector 10 through the spacing shim 63. From that point on, further turning of the alignment sleeve 59 causes the optical contact assembly 75 of the mating connector 70 to be compressed, thereby providing the desired spring loaded coupling between the alignment bushings 79 and 57.

What is claimed is:

1. A fiber optic feedthrough connector assembly comprising:
   a. a housing having a wall disposed therein, and
   b. elongated fiber optic contact means extending through said wall and terminating at each of its opposite ends in a light coupling surface, said light coupling surfaces being on opposite sides of said wall.

2. The connector of claim 1 additionally characterized in that said assembly is hermetically sealed where said contact means extends through said wall.

3. The connector of claim 1 characterized further in that said contact means comprises a double ended terminus having an optic fiber extending therethrough.

4. The connector of claim 3 characterized further in that said double ended terminus comprises:
   a. a pin, said optic fiber extending axially along said pin, and
   b. a bushing at each end of said pin, said optic fiber terminating at its opposite ends in respective ones of said bushings.

5. The connector of claim 4 characterized further in that said housing comprises:
   a. a core portion containing said wall and having a pair of threaded receptacles extending in opposite directions from and separated by said wall, and
   b. a pair of threaded cylindrical inserts threadably coupled to respective ones of said receptacles, said cylindrical inserts protectively extending around and beyond said fiber optic contact means.

6. The connector of claim 5 characterized further by an alignment sleeve mounted on at least one end of said double ended terminus, said alignment sleeve being entirely within one of said inserts.

7. The connector of claim 1 characterized further in that said contact means comprises a double ended terminus having an optic fiber extending therethrough and in that said terminus is tipped at each end by an alignment bushing in which said optic fiber terminates.

8. The connector of claim 7 characterized further in that said double ended terminus is hermetically sealed where it extends through the wall of said housing.

9. The connector of claim 7 characterized further in that said connector includes a pair of cylindrical inserts extending in opposite directions from a central portion of said housing, each insert surrounding a respective one of the ends of said double ended terminus and the bushing thereon.

10. The connector of claim 7 characterized further in that said connector includes a pair of alignment sleeves, each mounted on one end of said double ended terminus, and each having an opening for receiving a fiber optic terminus for mating with said connector.

11. The connector of claim 10 characterized further by a pair of cylindrical inserts extending in opposite directions from a central portion of said housing, each insert surounding a respective one of the ends of said double ended terminus and the alignment sleeve mounted thereon.

12. The connector of claim 11 characterized further in that said fiber optic contact means comprises a pin, an alignment bushing at each end of said pin, and an optic fiber extending axially through said pin and terminating in said bushings.

13. An optical feedthrough connector assembly comprising:
    a housing having a passage extending therethrough;
    an elongated optical contact means in said passage, said contact means terminating at each of its opposite ends in a light coupling surface; and
    an alignment sleeve extending into said passage and being carried by said contact means, an end portion of the alignment sleeve extending axially outwardly beyond an end of the contact means.

14. A connector as described in claim 13 wherein said housing includes a core portion and an insert defining an end portion of the passage, the insert being removably coupled to the core portion and removable from the core portion to expose one of said light coupling surfaces.

15. A connector as described in claim 13 wherein said fiber optic contact means comprises a pin, an alignment bushing at each end of said pin, and an optic fiber extending axially through said pin and terminating in said bushings.

16. An optical feedthrough connector assembly comprising:

a housing having a passage extending therethrough;

an elongated optical contact means in said passage, said contact means terminating at each of its opposite ends in a light coupling surface; and said housing including a core portion and an insert defining an end portion of the passage, the insert being removably coupled to the core portion and removable from the core portion to expose one of said light coupling surfaces.

17. A connector as described in claim 16 wherein said fiber optic contact means comprises a pin, an alignment bushing at each end of said pin, and an optic fiber extending axially through said pin and terminating in said bushings.

* * * * *